United States Patent [19]
Fleming

[11] 3,761,705
[45] Sept. 25, 1973

[54] REFLECTIVE LIGHTED MIRROR
[75] Inventor: John Stuart Fleming, Niagara Falls, N.Y.
[73] Assignee: Floxite Company, Inc., Niagara Falls, N.Y.
[22] Filed: Aug. 17, 1971
[21] Appl. No.: 172,432

[52] U.S. Cl. ................................................ 240/4.2
[51] Int. Cl. ............................................ F21v 33/00
[58] Field of Search .................... 240/4.2, 4.1, 2.18; 128/21, 22, 23

[56] References Cited
UNITED STATES PATENTS
3,368,068  2/1968  Cronheim ........................... 240/4.2
1,750,194  3/1930  Rydman ............................. 240/2.18
2,082,857  6/1937  Thoroughgood ..................... 240/4.2

Primary Examiner—Donald O. Woodiel
Attorney—Watson, Cole, Grindle & Watson

[57] ABSTRACT

A mirror is arranged to reflect a relatively large area of the observer's head or face and hinged thereto for adjustment at a variety of vertical angles is a directed source of light for casting a definite restricted beam toward the mirror and thence reflected onto a restricted area of the observer's features. Both the restricted nature of the reflected beam and the positioning of the light source with its rear dark end in front of the eyes of the observer serve to shield his eyes from the glare of the light beam. The mirror is preferably of the concave variety.

1 Claim, 4 Drawing Figures

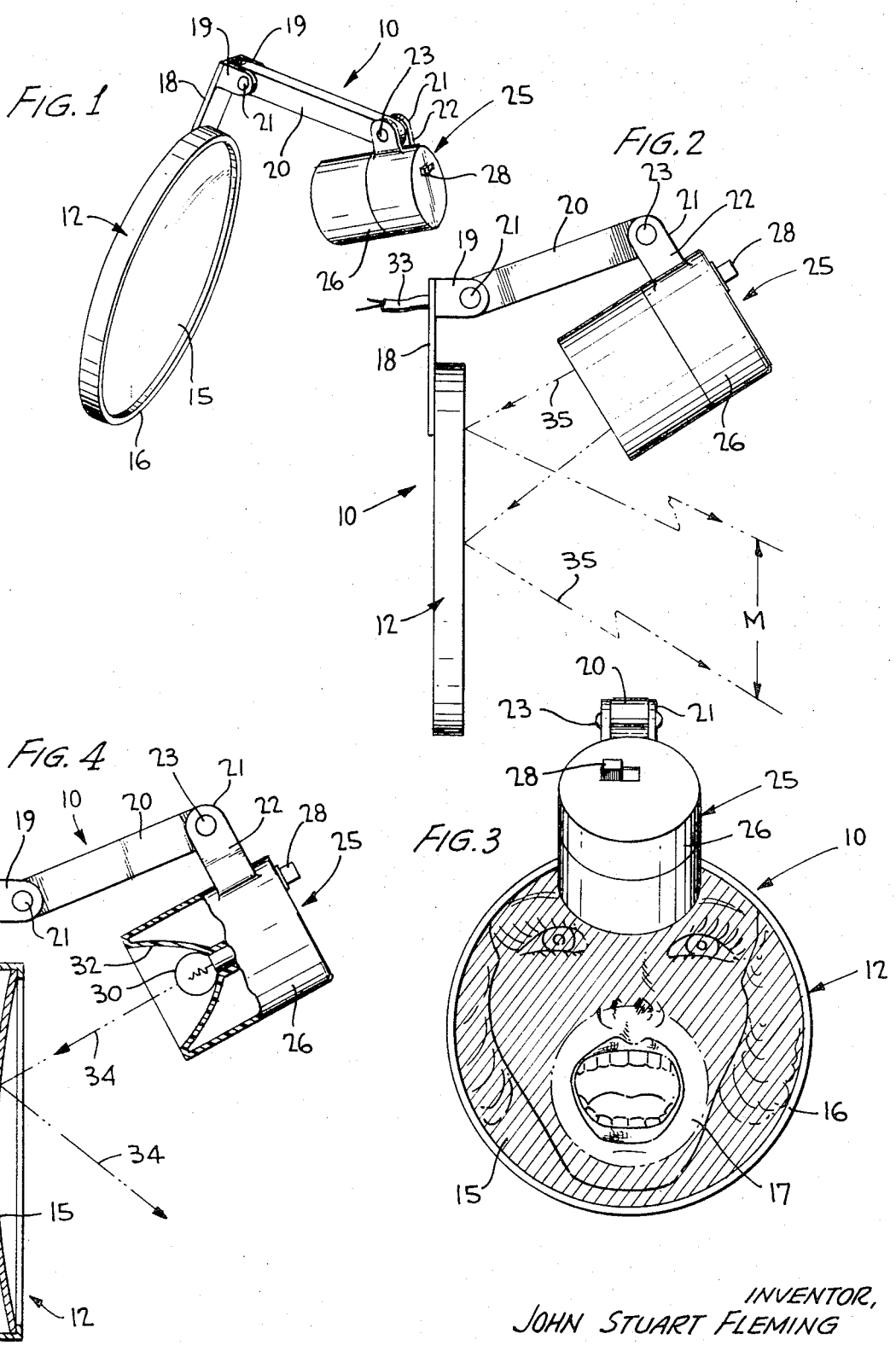

REFLECTIVE LIGHTED MIRROR

This invention relates to an improved device for the visual examination or inspection of the facial features of an individual by the individual himself, and is more particularly useful in the inspection of the oral cavity for ascertaining dental conditions, or in the observance of the face or hair for cosmetic, grooming, or diagnostic purposes.

Many prior proposals for the self examination of an individual's features have been made, especially in the form of dental mirrors, for example, adapted for insertion into the mouth. Some of these have also been provided with small light sources for better illumination of the oral cavity. Others, like the arrangement disclosed in my U.S. Pat. No. 3,459,178 of Aug. 5, 1969, have provided a mirror in combination with a source of light rigidly fixed with relation thereto but partially screened so as to directly illuminate considerable areas of the face, more particularly the oral cavity, but leaving the eyes of the viewer in shadow.

These prior devices have had their limited uses for various purposes but have not had the adaptability, adjustability, close focusing or wide scope of utility which are afforded by the present invention.

In its preferred embodiment, the invention contemplates the provision of an improved device of the character described comprising a mirror of ample boudoir dimensions which affords a relatively complete reflection of the observer's entire head or face; and for the clear and precise inspection of specific portions of the features, there is adjustably secured to the frame of the mirror a light source for directing a restricted or rather concentrated beam of light toward the surface of the mirror to be reflected back to any portion of the face desired, while at the same time avoiding reflection into the user's eyes. The light source is thus positioned in front of the observer's eyes but the light beam being directed forwardly into the mirror, the rear end of the light fixture within the view of the user is, of course, dark and no glare is experienced. Also, the fixture itself is of relatively small area and only a small portion of the over-all view in the mirror is obscured.

To utilize the entire area of the mirror as in the case of the usual boudoir or dressing table mirror, the lighting fixture can be swung out of the way.

Other objects and features will be apparent from an inspection of the following specification, when read in connection with the accompanying drawings, in which one embodiment of the invention is illustrated by way of example.

In the drawings:

FIG. 1 is a view in perspective of a light and sight reflective mirror combination embodying the principles of the invention;

FIG. 2 is a view in side elevation indicating diagrammatically the approximate path of the beam of light from the source to the mirror and thence to the limited area of the observer's face to be illuminated;

FIG. 3 is a front view of the device indicating the reflective image of the observer's entire face and the limited area of illumination chosen here as in the vicinity of the mouth as for dental inspection; and FIG. 4 is a view similar to FIG. 2 but with certain portions of the mirror and light source shown in section.

In the drawings, there is shown an illustrative device designated by the general reference numeral 10, which includes the mirror assembly 12 comprising (as suggested in FIG. 4) the concave mirror element 15 set in the frame 16.

A stub bracket 18 is appropriately secured preferably to the upper portion of the frame 16, and is provided with ears 19 for pivotally embracing one end of a link 20 which is pivoted thereto upon the hinge pin 21.

The opposite end of the link 20 is received between the ears 21 comprising bracket 22 and pivoted thereto upon the hinge pin 23. The bracket is secured to or forms a part of the light fixture designated generally by the numeral 25.

The fixture 25 includes the cylindrical casing 26, the rearward portion of which may contain batteries (not shown) and supports the light control switch 28. The forward portion of the casing 26 is shaped to form a socket for the light bulb 30 and to provide a parabolic reflector 32 (see FIG. 4).

If a relatively high voltage lamp is used, it may be connected to a source of current as by means of the wiring suggested at 33.

The ears 19 and 21 of each of the pairs are biased toward each other so as to frictionally clamp the respective ends of the link 20 between them, thereby providing for stable angular adjustment of the position of the light source 25 with respect to the mirror assembly 12.

The arrows 34 in FIG. 4 indicate the general direction of the light beam onto and reflected from the surface of the mirror 15, and in FIG. 2 the arrows 35 show a little more explicitly how the relatively restricted narrow beam projected from the parabolic reflector 32 and striking the mirror is reflected by only a slightly larger beam onto the restricted area of the observer's face. This area is shown more specifically in FIG. 3 as the unshaded circle M surrounding the mouth of the individual's face.

While the invention is not to be considered limited to specific dimensions, it is suggested that the mirror may be in the range of say 8 to 12 inches in diameter, and may have a concavity of say about 18 inches spherical radius. The backing or frame 16 may be made of any suitable material such as metal, wood, or plastic.

The light source could be, for example, a 7-volt bulb, and the cylindrical casing 26 with its parabolic reflector 32 could be such as to cast a light beam of approximately 2 inches diameter, which, when reflected by the concave mirror, would not produce an illuminated area M of much greater than say from 3 to 5 inches in diameter.

It is readily understood how the indirect or reflected light is prevented from entering the eyes of the observer by the confining of the beam to the area M, and it can be also seen that the eyes are protected from the direct rays by the rearward portion of the light casing 26 itself.

It is also apparent that the length of the line of sight in the case of reflective self-examination is about twice that of the direct line of sight, say of a dentist or other operative. Thus the slight magnification afforded by the concavity of the present mirror surface 15 counterbalances this discrepancy.

I claim:

1. An easily portable light and sight reflective device for the selfexamination of facial features or the like of an individual, comprising in combination a boudoir or toilet mirror of conventional diameter and being concave to afford some degree of magnification, a light fixture comprising a light bulb having a parabolic reflector for focussing a concentrated beam of light of restricted diameter into the mirror to be reflected onto a portion only of the face of the viewer, a friction hinged bracket for adjustably securing said light fixture directly to said mirror to position it between the reflecting surface of the mirror and the viewer's face, and means for shielding the rearward portion of said fixture to prevent direct emission of light toward the face, the degree of spherical curvature of the mirror being below that at which the restricted diameter of the direct beam projected onto the mirror would result in such a magnification of the diameter of the beam reflected as would cause it to impinge on the viewer's eyes or unnecessarily illuminate more of his features than the restricted area under examination.

* * * * *